United States Patent [19]
Shuey
[11] 3,761,799
[45] Sept. 25, 1973

[54] CURRENT STABILIZING CIRCUIT HAVING MINIMAL LEAKAGE CURRENT EFFECTS

[75] Inventor: David R. Shuey, Webster, N.Y.
[73] Assignee: Xerox Corporation, Stamford, Conn.

[22] Filed: Dec. 6, 1971
[21] Appl. No.: 204,847

[52] U.S. Cl. .......... 323/4, 307/297, 323/9, 323/22 T, 323/25
[51] Int. Cl. .......... G05f 1/56
[58] Field of Search .......... 323/4, 8, 9, 22 T, 323/2 S, 23; 307/31, 32, 33, 34, 297

[56] References Cited

UNITED STATES PATENTS

| | | | |
|---|---|---|---|
| 3,201,606 | 8/1965 | Mamon | 323/9 |
| 3,024,422 | 3/1962 | Jansson | 323/22 T |
| 3,160,807 | 12/1964 | Packard | 323/22 T |
| 3,310,731 | 3/1967 | Ostroff et al. | 323/9 X |
| 3,174,093 | 3/1965 | Finkelstein | 323/9 |
| 3,539,865 | 11/1970 | Billings | 323/8 |

*Primary Examiner*—Gerald Goldberg
*Attorney*—James J. Ralabate et al.

[57] ABSTRACT

Apparatus for stabilizing the current flowing through a current utilization device is disclosed in accordance with the teachings of the present invention wherein a voltage divider network including a plurality of series connected transistor means is coupled to the current utilization device and a current regulating transistor means is connected to the voltage divider network. A summation of the leakage currents induced in each of the transistor means included in the divider network is supplied to the output electrode of the current regulating transistor by voltage limiting means such that the total current flowing in the output electrode circuit of the current regulating transistor means is substantially equal to the current flowing through the current utilization device. Stabilization of the current flowing in the output electrode circuit results in stabilization of the current flowing through the current utilization device without requiring regulation of the leakage current induced in each of the transistor means included in the voltage divider network. Discrete or continuous modulation of the stabilized current flowing through the current utilization device may be provided.

14 Claims, 2 Drawing Figures

Figure 1:
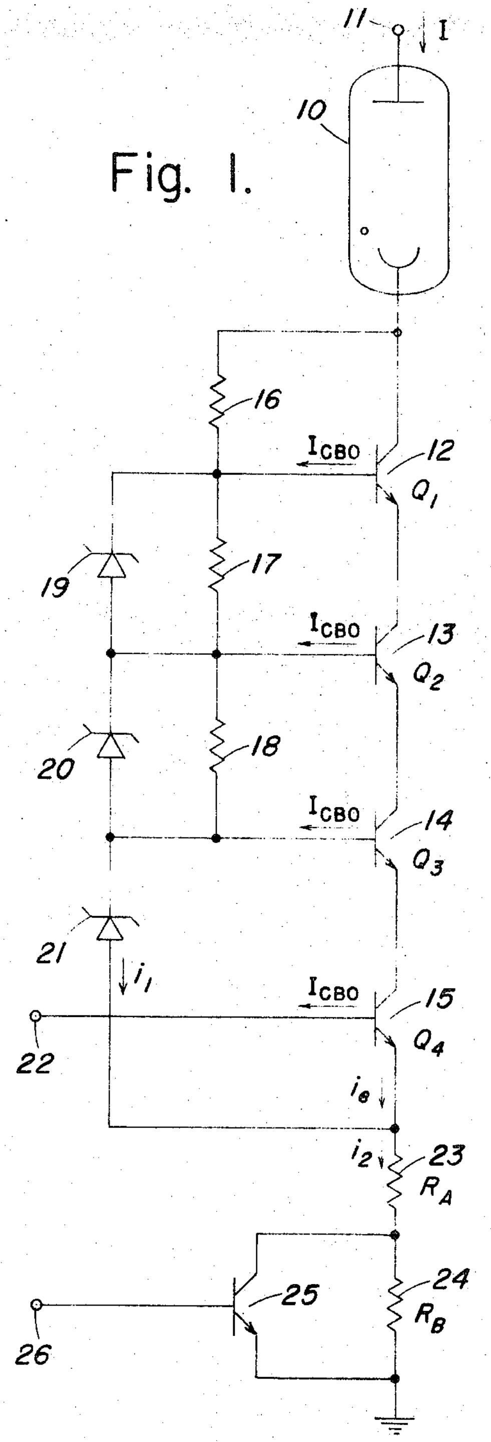

INVENTOR.
David R. Shuey
BY
Marn & Jangarathis
ATTORNEYS

CURRENT STABILIZING CIRCUIT HAVING MINIMAL LEAKAGE CURRENT EFFECTS

This invention relates to current regulating devices and, in particular, to transistor circuits for stabilizing the low currents flowing through current utilization devices to which high voltages are applied.

Many devices that have recently been developed and introduced in various fields of electrical technology must be supplied with relatively high operating potentials. Some of these devices operate upon the current flowing therethrough. One such current utilization device that has received enthusiastic acceptance is the laser. The unique and advantageous features provided by the laser have resulted in diverse applications thereof to the fields of communication, office machinery, meteorology, medical treatment, and the like.

A conventional application of a laser device in the aforementioned field of communications employs a laser tube and means for modulating the current flowing through the laser tube to cause a corresponding change in the output power of said tube. Useful information is therefore represented by the change in the output power of the laser tube. It has been found however, that in current utilization devices, such as the laser tube, wherein high operating voltages supplied thereto result in relatively low currents flowing therein, the inherent operating characteristics thereof necessitate strict current stability. Semiconductor devices which have heretofore been utilized in current regulating techniques in other disciplines are not capable of withstanding the aforementioned high operating voltages. Although high voltage power transistors adapted to sustain high voltages applied thereto have been developed, these transistors suffer from the disadvantage of high leakage current. Thus, a significant impairment to the stabilization of the low currents flowing through the current utilization device is presented by these transistors.

Accordingly, the prior art has attempted to regulate the current flowing through a current utilization device to which high voltages are supplied by providing a cascaded connection of low voltage transistors. The cascaded connection forms a voltage divider network such that the high voltage supplied to the current utilization device is divided across each of the cascaded transistors, subjecting each transistor to an acceptable voltage. A typical circuit comprised of cascaded transistors heretofore employed by the prior art includes a plurality of transistors having collector and emitter electrodes connected in series relationship wherein the collector electrode of the first transistor is connected in series with the current utilization device and the emitter electrode of the last transistor is connected in a series with a controllable transistor. The base electrode of each cascaded transistor is connected to a corresponding junction of series connected resistors. Thus the current flowing through the current utilization device is adapted to flow through each of the cascaded transistors and the high voltage supplied to the current utilization device is divided across each of such cascaded transistors. A regulating voltage supplied to the base electrode of the controllable transistor is capable of regulating the current flowing through the controllable transistor which, in turn, varies the current flowing through the cascaded transistors and through the current utilization device. It has been contemplated therefore, that the current flowing through the current utilization device would be accurately and strictly stabilized in accordance with the regulating voltage applied to the controllable transistor. It has been determined however that the current flowing through the current utilization device is equal to the current flowing through the controllable transistor plus the sum of the leakage currents of each of the cascaded transistors. Moreover, the leakage current in each cascaded transistor flows from the collector electrode to the base electrode thereof and then through the series connected resistors to ground. These leakage currents present a significant contribution to the unstable current characteristics of the current utilization device. In addition, the application of a regulating voltage to the controllable transistor has proven ineffective in mitigating this instability. Thus, in applications employing a current utilization device such as a laser, wherein the low current flowing therethrough (on the order of 1 milliamp) must be stabilized to within 0.1 milliamp, the aforedescribed current stabilizing circuit of the prior art has been most disappointing.

Therefore, it is an object of the present invention to provide semiconductor apparatus for rigidly stabilizing the current flowing through a current utilization device.

It is another object of the present invention to provide a voltage divider network including a plurality of series connected transistor means for stabilizing the current flowing through a current utilization device wherein the effects of the leakage currents of said transistors are substantially minimized.

A further object of this invention is to provide an improved current stabilizing circuit for use with a current utilization device having relatively high voltage and low current requirements.

An additional object of the present invention is to provide a stabilized current modulator adapted to be utilized with a laser tube.

Various other objects and advantages of the invention will become clear from the following detailed description of an exemplary embodiment thereof, and the novel features will be particularly pointed out in connection with the appended claims.

In accordance with the invention, apparatus is provided for stabilizing the current flowing through a current utilization device, comprising a voltage divider network including a plurality of cascaded transistor means; a current regulating transistor means connected in series relationship with the last cascaded transistor means included in said voltage divider network for regulating the current flowing through said voltage divider network in response to a control voltage applied to the current regulating transistor means; and voltage limiting means for supplying a summation of the leakage currents inherent in each of the cascaded transistor means interconnected between the voltage divider network and the output terminal of the current regulating transistor means. Current modulating means may be coupled to said current regulating transistor means.

Figure 2:
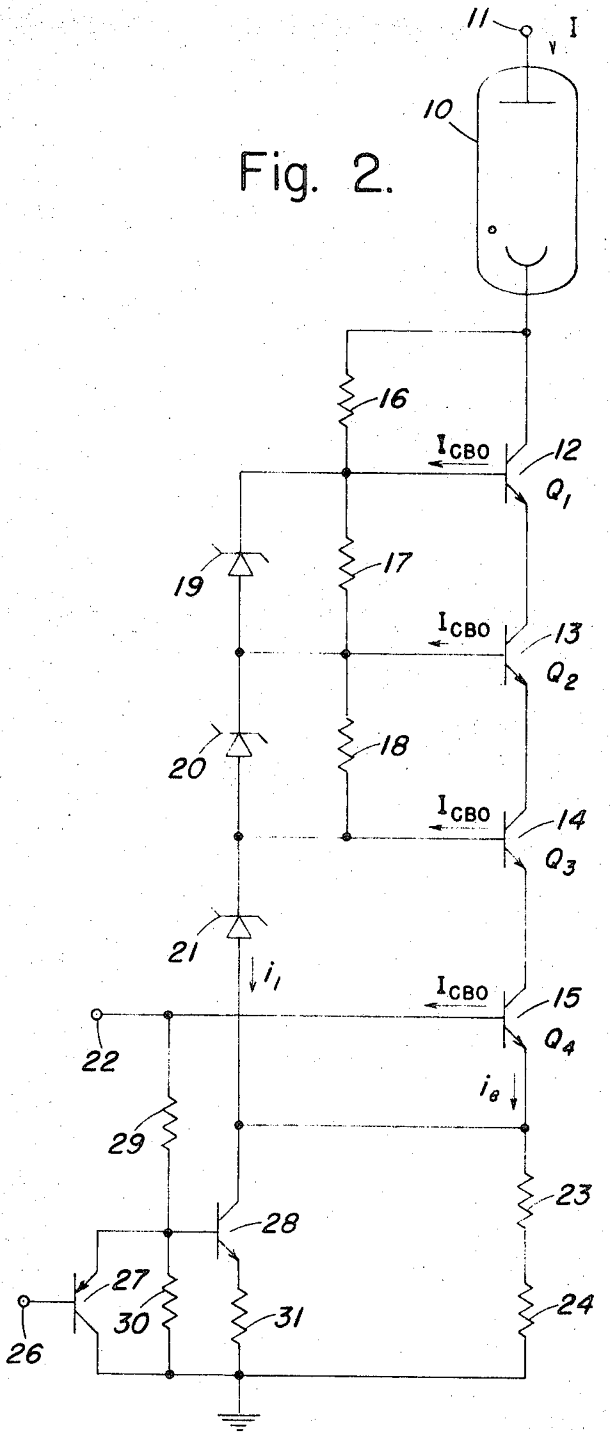

The invention will be more clearly understood by reference to the following detailed description of exemplary embodiments thereof in conjunction with the accompanying drawings in which:

FIG. 1 is a schematic diagram of one embodiment of a stabilizing circuit in cooperation with a discrete current modulator; and FIG. 2 is a schematic diagram of another embodiment of a stabilizing circuit in cooperation with a continuous current modulator.

Referring now to the drawings wherein like reference numerals are used throughout, and in particular to FIG. 1, there is illustrated a current utilization device 10, a voltage divider network comprised of cascaded transistor means 12, 13 and 14, current regulating transistor means 15, voltage limiting means 21 and variable impedance means comprised of resistance means 23 and 24 and transistor means 25. The current utilization device 10 may comprise any conventional device adapted to be supplied with relatively high voltages and to sustain a relatively low current flow therein. For purposes of explanation, the current utilization device 10 is assumed to be a laser tube to which is applied high voltages on the order of 1,000 – 2,000 volts d.c. and through which flow low currents on the order of 1 – 10 milliamps. A typical laser tube may be a HeNe laser produced by Spectra-Physics, Inc., Mountain View, California. An input terminal 11 is provided to supply the current utilization device 10 with the requisite high operating voltage.

A voltage divider network comprised of a plurality of cascaded transistor means is coupled to the output terminal of current utilization device 10. The voltage divider network is illustrated herein as including three transistor means 12, 13 and 14; however, it should be clearly understood that the present invention is not limited solely to the three transistor means depicted as it is contemplated that any convenient number of transistor means may be employed. The transistor means are further illustrated as being NPN transistors having collector and emitter electrodes connected in series relationship. If desired, PNP transistors may be utilized wherein the illustrated collector and emitter electrodes may be interchanged or, in the alternative, FET semiconductor devices may be adopted. In addition, each transistor means may be comprised of a composite Darlington transistor circuit. In any event, the transistor means are connected such that a continuous current path exists from the collector electrode of the first transistor means 12 to the emitter electrode of the last transistor means 14 whereby current flows from an input electrode to an output electrode of each of the cascaded transistor means. Resistance means 17 and 18 interconnect the control electrodes, i.e., the base electrode of a conventional NPN or PNP type transistor or the gate electrode of a conventional FET transistor, of adjacent transistor means. Thus, resistance means 17 is connected between the control electrodes of transistor means 12 and 13 and resistance means 18 is connected between the control electrodes of transistor means 13 and 14. A resistance means 16 connects the output terminal of current utilization device 10 to the control electrode of transistor means 12 and serves to bias the voltage divider network to an appropriate value. In addition, voltage limiting means 19 and 20 are illustrated as being connected in parallel relationship with resistance means 17 and 18 for the purpose of limiting the maximum voltage applied to the control electrode of each of the transistor means included in the voltage divider network. The provision of these voltage limiting means is optional and may be omitted if desired. Each of the voltage limiting means may comprise a conventional zener diode or the like. One of ordinary skill in the art will recognize that the parallel connection of resistance means and voltage limiting means form regulating circuits whereby the operating voltages to which each of the cascaded transistor means are subjected are maintained below maximum permissible limits. Typically, each voltage limiting means may have a voltage rating of 220 volts.

Current regulating transistor means 15 is connected in series relationship with the last cascaded transistor means 14 included in the voltage divider network. The current regulating transistor means 15 may be identical to the transistor means included in the voltage divider network, such as transistor model no. MJE 340, manufactured by the Semiconductor Division of Motorola, Inc., and includes a control electrode coupled to terminal 22. Terminal 22 is adapted to receive a control signal applied thereto and to supply the control signal to the control electrode of current regulating transistor means 15 for the purpose of regulating the current flowing through the collector and emitter electrodes of the current regulating transistor means. Accordingly, the control signal may be a voltage derived from the voltage divider network or from further circuitry not shown. The output, or emitter, electrode of current regulating transistor means 15 is coupled to the control electrode of the last of the cascaded transistor means 14 included in the voltage divider network by voltage limiting means 21, which voltage limiting means may comprise a zener diode or the like, similar to the voltage limiting means 19, 20.

The output, or emitter, electrode of current regulating transistor means 15 is coupled to a reference potential such as ground potential via the variable impedance means comprised of series connected resistance means 23 and 24 and transistor means 25. The effective impedance of the series connected resistance means 23 and 24 is adapted to be varied by providing a switching device in shunt relationship with resistance means 24. FIG. 1 illustrates that the switching device may comprise a conventional switching transistor 25 having a base electrode connected to terminal 26 to which a modulating signal, such as a switching pulse of limited duration, may be applied. It will be seen from the forthcoming description that the application of a switching signal to terminal 26 activates switching transistor 25 to decrease the impedance between the output, or emitter, electrode of current regulating transistor means 15 and ground potential, thereby increasing the current flowing through the current utilization device 10. Conversely, deactivation of switching transistor 25 results in an increase in impedance between the output, or emitter, electrode of current regulating transistor means 15 and ground potential, thereby decreasing the current flowing through the current utilization device 10.

The operation of the circuit schematically illustrated herein will now be described. The voltage applied to input terminal 11 may admit of a magnitude such that the voltage limiting means 19, 20 and 21 operate in their respective conducting states. If the voltage limiting means are assumed to be zener diodes, it will be understood that each of the zener diodes may, in this case, operate in its break-down region. However, if the applied voltage obtains a lower magnitude, voltage limiting means 19 and 20 may not operate in their conducting states. The control electrodes of each of the cascaded transistor means 12-14 included in the voltage divider network, as well as the control electrode of current regulating transistor means 15, are maintained at a nearly constant voltage notwithstanding variations in the voltage applied to input terminal 11 or appearing at the output of the current utilization device 10. Hence, each of the cascaded transistor means 12–14 is biased into conduction and the voltage appearing at the output of current utilization device 10 is equally divided across the collector-emitter electrodes of each transistor means. A suitable bias potential may be applied to terminal 22 such that current regulating transistor means 15 is also biased into conduction whereby a proportionate amount of the aforementioned output voltage is provided across the collector and emitter electrodes thereof.

One of ordinary skill in the art will appreciate that the voltage applied across each of the transistor means 12–15 induces a leakage current from the collector electrode to the base electrode thereof. Thus, the current I flowing through the current utilization device 10 is equal to the sum of the leakage currents plus the emitter current of the current regulating transistor means 15. The current I may therefore be represented by the equation:

$$I = I_{CBO(Q1)} + I_{CBO(Q2)} + I_{CBO(Q3)} + I_{CBO(Q4)} + i_e$$

Since however, each of the voltage limiting means 19–21 admits of its conducting state, the leakage currents of each of transistor means 12–14 are algebraically combined and applied to the emitter electrode of current regulating transistor means 15 by voltage limiting means 21 as the current $i_1$. Furthermore, the current $i_2$ flowing in the emitter circuit of current regulating transistor means 15 may be represented by the equation:

$$i_2 = i_1 + i_e$$

Consequently, the current I flowing through he current utilization device 10 may now be represented by the equation:

$$I = i_2 + I_{CBO(Q4)}$$

Since the current $i_2$ flowing in the emitter circuit of current regulating transistor means 15 may be facilely regulated by the signal applied to terminal 22 it may be observed that the stability of the current I flowing in the current utilization device 10 is solely dependent upon the leakage current $I_{CBO(Q4)}$ induced in the current regulating transistor means 15. One of ordinary skill in the art will appreciate that the leakage current of current regulating transistor means 15 may be minimized such that it obtains a negligible level if the current regulating transistor means 15 is selected to exhibit a low leakage current. Alternatively, the current regulating transistor means may be comprised of a conventional low voltage transistor. This, in turn, will not affect the operation of the voltage divider network comprised of the cascaded transistor means 12–14 since most of the voltage at the output of the current utilization device 10 has been assumed to be supplied across the voltage divider network. Consequently, each of transistor means 12–14 may be high voltage transistors capable of withstanding relatively high voltages inasmuch as the effect of the leakage currents thereof, which have heretofore contributed to the instability of the current I flowing through the current utilization device 10, may be readily counteracted by the control signal applied to terminal 22.

Thus, it is seen that the present invention provides unique apparatus for stabilizing the current flowing through a high voltage current utilization device. Moreover, the unstable effects attributed to leakage currents that have characterized prior art semiconductor devices have been successfully and inexpensively eliminated by the apparatus of the present invention.

Accordingly, the current flowing through the current utilization device 10 may be modulated without affecting the stability thereof. Hence, the magnitude of the regulated current $i_2$ flowing in the emitter circuit of current regulating transistor means 15, which is substantially equal to the magnitude of the current I flowing in the current utilization device 10, is dependent upon the effective impedance of the variable impedance means comprised of resistance means 23 and 24 and switching transistor 25. In the absence of a switching signal applied to terminal 26, the current I is substantially equal to:

$$V_{22} - v_{be(Q4)}/R_A + R_B$$

where $V_{22}$ is equal to the voltage applied to terminal 22, $V_{be(Q4)}$ is equal to the voltage across the base and emitter electrodes of current regulating transistor means 15, $R_A$ is equal to the resistance of resistance means 23 and $R_B$ is equal to the resistance of resistance means 24. When a switching signal is applied to terminal 26 switching transistor 25 is driven into saturation thereby providing a short circuit across resistance means 24. In this state, the current I flowing through the current utilization device 10 is substantially equal to:

$$V_{22} - v_{be(Q4)}/R_A$$

Although the modulating circuit described and illustrated herein has been assumed to be a discrete modulator comprised of variable impedance means, it should be clearly understood that the present invention may be readily utilized with any conventional pulse modulating circuit or continuous modulating circuit depending upon the particular application thereof.

Turning now to FIG. 2, there is illustrated another embodiment of the stabilizing circuit in accordance with the present invention in coopreation with a continuous current modulating circuit. This embodiment is comprised of current utilization device 10, a voltage divider network comprised of cascaded transistor means 12, 13 and 14, current regulating transistor means 15, voltage limiting means 21 and the continuous current modulating circuit comprised of transistor means 27 and 28 and voltage dividing resistances 29 and 30. The current utilization device 10, voltage divider network, current regulating transistor means 15 and voltage limiting means 21 may be identical to the aforedescribed corresponding components illustrated in FIG. 1. Accordingly, further description thereof is unnecessary and it is now appreciated that the current I flowing through the current stabilization device 10 is effectively stabilized. The presently described embodiment serves to provide a continuous modulation of the stabilized current I from a maximum value to a minimum value thereof. Transistor means 27, illustrated herein as a PNP transistor, includes a control electrode, such as the base electrode thereof, coupled to terminal 26 and an output electrode, such as the collector electrode thereof, coupled to a reference potential, such as ground potential. The input, or emitter, electrode of transistor means 27 is coupled to the common junction of voltage dividing resistances 29 and 30. The voltage dividing resistances are connected in series between terminal 22 and ground potential and are adapted to divide the constant voltage applied to terminal 22 by a predetermined amount such that a biasing signal is applied to the emitter electrode of transistor means 27. It is seen that the biasing signal serves to establish the magnitude of the modulating signal that must be applied to terminal 26 in order to drive transistor means 27 into its conducting state. Since transistor means 27 is illustrated as a PNP transistor, the transistor means will experience an increase in conduction as the voltage applied to terminal 26 decreases with respect to the voltage applied to the emitter electrode thereof. Conversely, as the voltage difference between the emitter electrode of transistor means 27 and terminal 26 decreases, i.e., as the voltage applied to terminal 26 increases, the transistor means experiences a decrease in conduction.

The emitter electrode of transistor means 27 is coupled to the control electrode, such as the base electrode, of transistor means 28. The latter transistor means may comprise an NPN transistor having an input, or collector, electrode coupled to the emitter electrode of current regulating transistor means 15 and an output, or emitter, electrode coupled to ground potential by resistance means 31. It is understood that transistor means 28 is adapted to experience an increase in conduction when the voltage applied to the control electrode thereof increases and, conversely, a decrease in conduction when the voltage applied to the control electrode thereof decreases. Thus, the amount of current flowing through transistor means 28 varies proportionally with control electrode voltage thereof.

The operation of the modulating circuit illustrated in FIG. 2 will now be described. The maximum modulating signal supplied to terminal 26 is established to be sufficient or nearly sufficient to drive transistor means 27 into its non-conducting state. Since the transistor means 27 is illustrated as a PNP transistor, the base-emitter voltage thereof will be a small negative value when a maximum modulating signal is supplied to terminal 26. Typically, if the biasing voltage applied to the emitter electrode of transistor means 27 by voltage dividing resistances 29 and 30 is +8.7 volts, the maximum modulating signal may be +8.0 volts. When transistor means 27 assumes its non-conducting state, the voltage thereacross is equal to the biasing voltage produced across resistance 30. The positive biasing voltage is sufficient to drive transistor means 28 into its conducting state and the current flowing therethrough admits of a maximum value. It is observed that the current I flowing through the current utilization device 10 is substantially equal to the sum of the currents flowing through transistor means 28 and through resistance means 23 and 24. It is here noted that the current flowing through resistance means 23 and 24 is independent of the conducting state of transistor means 28 and admits of a constant value. This obtains because the voltage across resistance means 23 and 24 is equal to the constant voltage applied to terminal 22 minus the base-emitter voltage of current regulating transistor means 15. Accordingly, the voltage across resistance means 23 and 24 is constant. Consequently, the current through resistance means 23 and 24 is constant. Thus, maximum current flow through transistor means 28 is obtained when a maximum modulating signal is applied to terminal 26, resulting in a maximum current I flowing in the current utilization device 10.

If now, the modulating signal applied to terminal 26 is reduced, the base-emitter voltage of transistor means 27 becomes increasingly negative, thereby increasing the conducting characteristics of transistor means 27. Consequently, the voltage produced at the emitter electrode of transistor means 27 decreases as the voltage across the transistor means decreases. It is appreciated that, as the emitter voltage of transistor means 27 is decreased, transistor means 28 experiences a decrease in conduction. The collector voltage is unaffected and the only effect is conduction. It is recalled that the current flowing through resistance means 23 and 24 admits of a constant value. Thus, a decrease in the current flowing through transistor means 28 results in a proportional decrease in the current I flowing in the current utilization device. One of ordinary skill in the art will now recognize that, as the modulating signal applied to terminal 26 continues to decrease until its minimum value is obtained the voltage produced at the emitter electrode of transistor means 27 is correspondingly decreased whereby transistor means 28 is driven towards its non-conducting state. Hence, the current I flowing in the current utilization device 10 is decreased to a minimum value. Conversely, as the modulating signal applied to terminal 26 increases, the current I flowing through the current utilization device increases. Thus, it is seen that the modulating circuit illustrated in FIG. 2 effects a continuous modulation of the current flowing through a current utilization device in accordance with an applied modulating signal. It is manifest that if the modulating signal is comprised of a pulse signal admitting of abrupt changes in amplitude between a maximum and minimum amplitude, the current I will be discretely modulated in a manner similar to that described in FIG. 1. Consequently, the modulating circuit illustrated in FIG. 2 is capable of performing a continuous or discrete modulating function, in accordance with the particular characteristics of the modulating signal applied thereto.

Although transistor means 27 and 28 are illustrated as PNP and NPN transistors, respectively, it is appreciated that the nature of the transistors may be interchanged. In addition, the biasing voltage produced by voltage dividing resistances 29 and 30 may be derived from any suitable source other than the control signal applied to terminal 22 and may be positive or negative. Moreover, both transistor means 27 and 28 may be PNP or NPN transistors if the current flowing through the current utilization device 10 is to vary in inverse relationship with respect to the modulating signal. It is clear that if the maximum and minimum values established for the modulating signal are exceeded, the foregoing operation of the modulating circuit will not be altered, provided the transistor means 27 and 28 are not driven beyond their breakdown characteristics.

While the instant invention has been particularly shown and described with reference to an exemplary embodiment thereof, it will be obvious to those skilled in the art that various changes and modifications in form and details may be made without departing from the spirit and scope of the invention. It is therefore intended that the appended claims be interpreted as including all such changes and modifications.

What is claimed is:

1. Apparatus for stabilizing the current flowing through a current utilization device, comprising:

a voltage divider network connected to said current utilization device, said voltage divider network including a plurality of transistor means wherein a first electrode of each of said transistor means is coupled to a second electrode of an immediately preceding transistor means;

current regulating transistor means having a first electrode coupled to the second electrode of the last transistor means included in said voltage divider network for regulating the current flowing through said voltage divider network in response to a control voltage applied to said current regulating transistor means; and voltage limiting means having a first terminal connected to the control electrode of said last transistor means included in said voltage divider network and a second terminal connected to a second electrode of said current regulating transistor means for limiting the voltage applied to said control electrode and for supplying a summation of the leakage currents inherent in each of said transistor means included in said voltage divider network to said second electrode of said current regulating transistor means.

2. The apparatus of claim 1 wherein said voltage divider network further includes a plurality of voltage limiting means coupled to the control electrodes of said transistor means included in said voltage divider network for limiting the maximum voltage applied to said control electrodes.

3. The apparatus of claim 2 wherein said voltage limiting means connected to said current regulating transistor means and each of said plurality of voltage limiting means are zener diodes.

4. In combination with a current utilization device having relatively high voltage and low current requirements and a voltage divider network connected to said current utilization device, said voltage divider network including a plurality of transistor means, each capable of withstanding relatively high voltages applied thereto and having respective collector and emitter electrodes connected in series relationship, the improvement for stabilizing the current flowing through said current utilization device, comprising:

current regulating transistor means having collector and emitter electrodes connected in series with said series connected collector and emitter electrodes of said transistor means included in said voltage divider network, said current regulating transis-tor means being responsive to a control voltage applied to the base electrode thereof for regulating the current flowing through the collector and emitter electrodes thereof; and voltage limiting means interposed in series relationship between the base electrode of the last transistor means included in said voltage divider network and an output electrode of said current regulating transistor means for limiting the voltage applied to said voltage divider network and for supplying said output electrode with a summation of the leakage currents induced in each of said transistor means included in said voltage divider network in response to said relatively high voltages applied thereto.

5. The improvement of claim 4 wherein said voltage limiting means is a zener diode.

6. Apparatus for modulating the current passing through a laser tube, comprising:

a voltage divider network connected to said laser tube, said voltage divider network comprised of a plurality of active elements, each capable of withstanding relatively high voltages applied thereto;

current regulating transistor means having input and output electrodes connected in series relationship with said voltage divider network and responsive to a control voltage applied to the control electrode thereof for regulating the current flowing through said input and output electrodes;

voltage limiting means having a first terminal connected to said voltage divider network and a second terminal connected to said output electrode for limiting the voltage applied to said voltage divider network and for supplying said output electrode of said current regulating transistor means with a summation of the leakage currents induced in each of said active elements included in said voltage divider network in response to said relatively high voltages applied thereto; and variable impedance means connected in series relationship with said current regulating transistor means and responsive to a modulating signal applied thereto for varying the impedance thereof, whereby the current passing through said laser tube is varied in a corresponding manner.

7. The apparatus of claim 6 wherein said active elements comprising said voltage divider network comprise a plurality of transistor means.

8. The apparatus of claim 7 wherein said voltage limiting means comprises a zener diode.

9. The apparatus of claim 8 wherein said variable impedance means comprises resistance means and switch means coupled to said resistance means for varying the value of said resistance means when said switch means is activated by said modulating signal applied thereto.

10. The apparatus of claim 9 wherein said switch means comprises switching transistor means connected in shunt relationship with said resistance means for short circuiting said resistance means in response to the application of said modulating signal to the control electrode of said switching transistor means.

11. Apparatus for modulating the current passing through a laser tube, comprising:

a voltage divider network connected to said laser tube said voltage divider network including a plurality of said transistor means, each capable of withstanding relatively high voltages applied thereto and having respective input and output electrodes connected in series relationship;

current regulating transistor means having input and output electrodes connected in series relationship with said voltage divider network and responsive to a control voltage applied to the control electrode thereof for regulating the current flowing through said input and output electrodes;

voltage limiting means having a first terminal connected to said voltage divider network and a second terminal connected to said output electrode of said current regulating transistor means for limiting the voltage applied to said voltage divider network and for supplying said output electrode of said current regulating transistor means with a summation of the leakage currents induced in said voltage divider network in response to high voltages applied thereto;

impedance means connected in series relationship with said current regulating transistor means and having a constant current flowing therein; and variable conducting means connected in shunt relationship with said impedance means and responsive to a modulating signal applied thereto for varying the current conducting characteristics thereof, whereby the current passing through said laser tube is varied in a corresponding manner.

12. The apparatus of claim 11 wherein said voltage limiting means comprises a zener diode.

13. The apparatus of claim 12 wherein said variable conducting means comprises complementary transistor means including first transistor means characterized by a conduction characteristic that varies in inverse relationship with said modulating signal and second transistor means coupled to said first transistor means and characterized by a conduction characteristic that varies in direct relationship with said modulating signal.

14. The apparatus of claim 13 wherein said first transistor means receives said modulating signal and said second transistor means is connected in parallel relationship with said impedance means and is controlled by said first transistor means.

* * * * *